Figure 1:
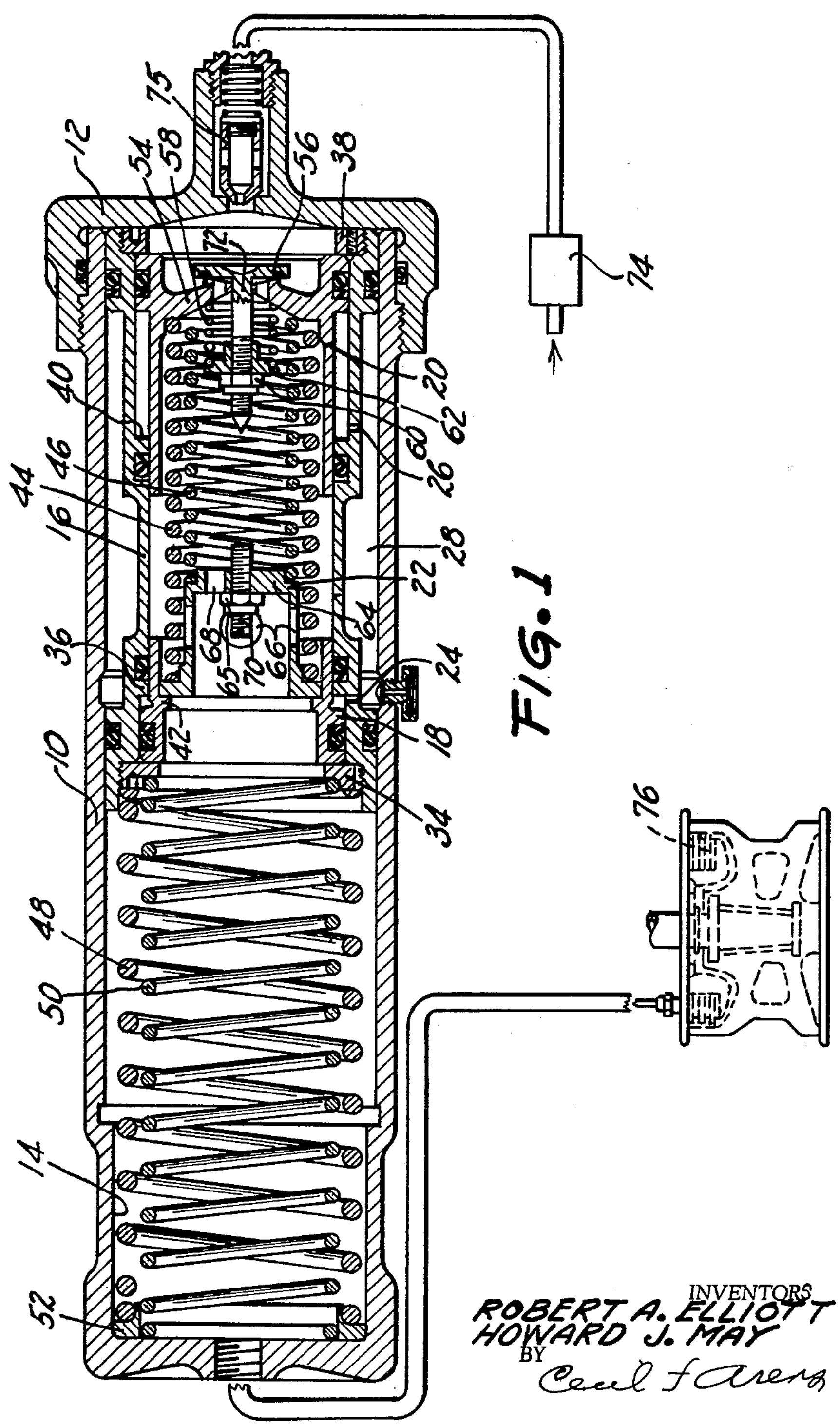

March 16, 1965 R. A. ELLIOTT ETAL 3,173,262

HYDRAULIC DEVICE

Filed June 22, 1962 2 Sheets-Sheet 1

INVENTORS
ROBERT A. ELLIOTT
HOWARD J. MAY
BY
Cecil F. Arens
ATTORNEY

INVENTOR.
ROBERT A. ELLIOTT
HOWARD J. MAY
BY
Cecil F. Arens
ATTORNEY

United States Patent Office 3,173,262
Patented Mar. 16, 1965

3,173,262
HYDRAULIC DEVICE
Robert A. Elliott and Howard J. May, South Bend, Ind., assignors to The Bendix Corporation, South Bend, Ind., a corporation of Delaware
Filed June 22, 1962, Ser. No. 204,367
3 Claims. (Cl. 60—54.5)

This invention relates to a hydraulic device for automatically adjusting and resetting the brakes. More particularly, the invention relates to the combination of an adjusting-resetting device and a flow preventing-limiting means which is so combined with a device that it will in no way interfere with the normal adjusting and resetting functions of the device, but will in the event of hydraulic failure, prevent flow through or limit flow through the device.

Heretofore, it has been proposed to meter a fixed quantity of fluid to the brake and thereafter limit further hydraulic communication with the brake to control the leakage flow. In addition, bulky, weighty devices have been proposed to eliminate flow after such a failure. In the latter cases especially, the devices have proven to be costly, and unless the device is fully charged with hydraulic fluid, an amount of fluid less than this predetermined amount is available for delivery to the brakes in which case the brake may not be fully applied. Furthermore, the prior art devices are generally of the manual resetting type requiring a visual inspection to ascertain whether or not there is a need for recharging the fluid within the device.

Accordingly, it is an object of this invention to provide a hydraulic adjusting and resetting device having a flow preventing and/or limited feature to insure adequate brake operation without fluid loss that would be detrimental to the system, and such a device as proposed by this invention is economical both from the standpoint of cost and weight.

Another object of this invention is to provide an automatic resetting adjusting mechanism which does not require visual inspection and manual replenishing.

It is also an object of this invention to provide a hydraulic adjuster and resetting mechanism which is position sensitive rather than pressure sensitive, such that flow through said mechanism cannot possibly occur until a member is displaced a predetermined distance.

Another object of this invention is to provide automatic brake adjustment by removing a set volume of fluid from the brakes by merely applying the brakes.

Still another object of this invention is to prevent the loss of a hydraulic system in the event a failure of given leakage magnitude occurs downstream of the lockout adjuster.

A further object of this invention is to provide a hydraulic device having an adjuster portion mounted coaxiallly with a lockout device inside a common tubular housing.

A still further object of this invention is to provide a preferred form of a hydraulic lockout adjuster including a plurality of pistons, a flow control device which limits and/or prevents fluid supply to operate said piston, a poppet valve that is actuated by a pintle incorporated in said pistons when said pistons are subjected to forces exceeding a predetermined value, which forces cannot come into play when a leak has occurred that ports fluid at or above the rate that fluid is being introduced to the adjuster.

Figure 2:
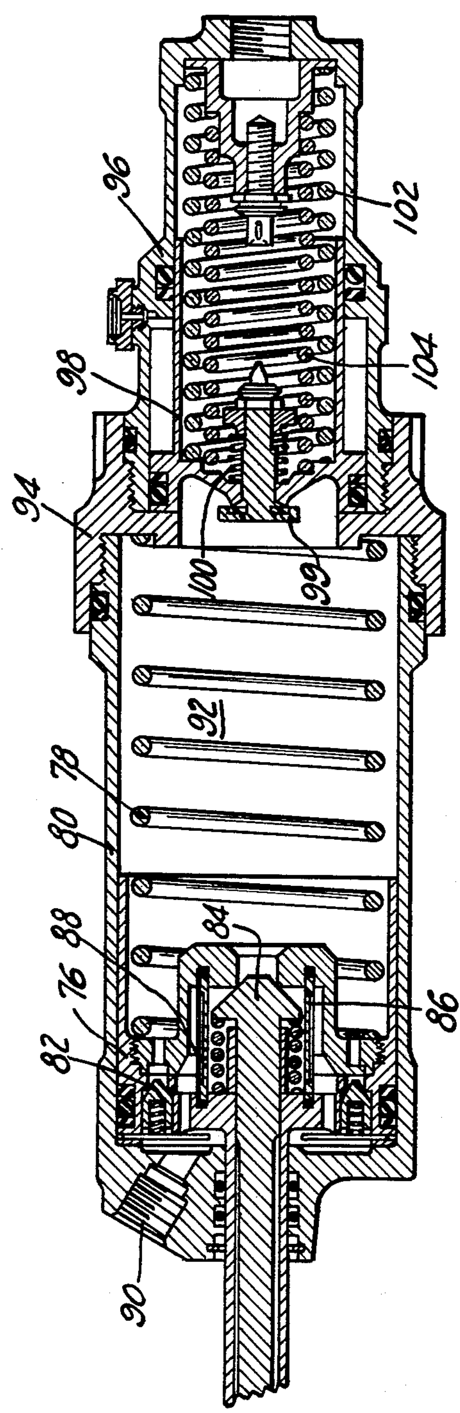

Other and further objects will appear to those skilled in the art from the following description and attendant drawing in which:

FIGURE 1 shows a side sectional view of our hydraulic lockout adjuster in one form with one of the preferred background environments schematically incorporated therewith; and FIGURE 2 shows another form of our lockout adjuster wih a flow preventing means.

With particular reference to FIGURE 1, there is shown a tubular cylinder 10 closed at one end and having a cap 12 threaded to the other end. The cylinder has essentially a constant internal diameter except for the shoulder 14 formed adjacent the closed end.

Within this cylinder we propose to slidably mount a plurality of pistons 16, 18, 20 and 22. As may be seen, each of the pistons carries an appropriate number of O-ring seals or the like, except for piston 22, which seals prevent fluid leakage about the sliding faces thereof as will be apparent to those skilled in the art. In addition, piston 16 is provided with vent passages 24 and 26 to prevent pressure lock within the chamber 28 formed between the ends of piston 16. Piston 16 is permitted to move between shoulder 14 and end cap 12. Piston 18 may move between the collar 34 threaded with the left face of piston 16 and the stop 36, which stop 36 is integrally formed with the interior wall of piston 16. Piston 20, on the other hand, may move between the collar 38 threaded to the right face of piston 16 and the stop 40 also integral with the interior wall 16. When piston 20 has traveled sufficient distance to engage stop 40 the flange of the piston 20 has also engaged the flange of piston 18 and forced it to move piston 18 against collar 34. Piston 22 is only limited by a stop 42 projecting from the interior wall of piston 18, and two coaxial springs 44 and 46 hold the piston thereagainst.

A pair of additional coaxial springs 48 and 50 extend between a still further collar 52 serving to locate said springs adjacent the closed end of the cylinder, and the collar 34 of piston 16. Thus, the piston 16 is biased to the right as viewed in the drawing.

Piston 20 is provided with central structure 54 having an orifice centrally thereof, which orfice is controlled by a poppet valve 56 biased by spring 58 to a closed position. As shown, the spring tension on valve 56 may be varied by rotating nut 60 to move the spring retainer ring 62 toward or away from said structure 54.

Piston 22 is also provided with wall structure 64 as well as orifices 66 in the sides of the walls of piston 22 and orifice 68 offset from the center in the wall 64. A pintle 70 is threaded through the wall 64 and adjustably positioned by a lock nut 65 such that the rightward projection through the wall 64, as viewed in FIGURE 1, is axially aligned with the poppet valve stem 72.

In operation, fluid is set to the cylinder 10 by a power brake valve 74 or pump or hydraulic acuating mechanism of similar characteristics. This fluid forces piston 20 toward the shoulder 40 and piston 18. Also, piston 16 is moved to the left in opposition to springs 48 and 50 until a predetermined pressure is developed whereupon piston 22 is moved to the right until pintle 70 causes poppet valve 56 to open to balance the pressures on both sides of piston 20.

When pressure is released or fluid is stopped from flowing to cylinder 10 fluid will return from the brake 76, or similar fluid actuated system, through the poppet valve 56 that is held open by pintle 70, due to pressure reaction on piston 18, until the pressure level is low enough to permit piston 22 to move to the left under the expansion forces of springs 44 and 46. This permits the poppet valve to close, and as pressure is further reduced or fluid flow completely stopped, the piston 20 moves to the right carrying piston 16 to remove fluid from the actuating system, such as brake 76 whereupon a running clearance may be maintained in the brake, etc.

If a failure occurs downstream of the lockout adjuster cylinder 10 so that pressure cannot be built up on the brake side equal to or greater than that required to move piston 18, piston 20 will merely move down and bottom, but the poppet will remain closed since insufficient pressure is available to move pintle 70 to unseat the poppet. In the event, however, that the downstream leakage as respects the adjuster 10 is not such as to displace an equivalent amount of fluid that is being introduced to the adjuster 10, we have provided a spring biased orifice valve 75 which will limit the amount of fluid being introduced to the piston 20 and also the amount of fluid that may exhaust through the orifice behind the valve 56 within piston 20, which valve is opened by movement of the piston assembly toward the left as viewed in FIGURE 1 and in turn a rightward movement of the piston 22, as above described.

With respect to the device shown in FIGURE 2, the lockout is composed of a spring loaded piston assembly 76 backed up by a spring 78 in a cylinder 80. The piston assembly incorporates a relief valve 82, a spring loaded check valve 84 and a sleeve 86 having a fixed restriction 88 therein. Flow from the power brake valve, as mentioned above, at a set pressure, enters the inlet 90 of cylinder 80, and as the pressure increases, the piston 76 moves against its spring and, if there is a restriction downstream, causes pressure within the variable volume chamber 92 to increase. As the pressure in chamber 92 increases, it finally reaches a set point whereupon the check valve 84 will open and, since the inlet pressure is greater than the pressure in chamber 92, because of the piston spring, the check valve will allow fluid to flow through the restrictor 88 and into the chamber 92. When the piston 76 approaches its maximum travel, the pressure chamber 92 will approach the inlet pressure. It is in this manner that the chamber 92 replenishes itself to make up for normal fluid losses downstream and thus eliminates manual servicing.

When the inlet pressure is reduced, the relief valve 82 opens to allow flow from chamber 92 to reduce the supply of fluid and at the same time, reduce the pressure therein. When the pressure within chamber 92 falls below the check valve set point, the check valve closes. The relief valve is also used to avoid pressure build-up when the fluid expands during period of rising temperature. To the right end of the cylinder 80 as viewed in FIGURE 2, there is mounted an adapter 94 which in turn mounts a cylinder 96. Within the cylinder 96 a brake or fluid actuating system adjuster is incorporated and is composed of a spring loaded piston 98 and a valve mounted through an orifice in the piston 98 closing same due to the action of a spring 100 biasing the valve to the closed position. Flow from the lockout, at a pressure equivalent to that in chamber 92, enters the adjuster to impinge upon the piston 98 causing it to move, as the pressure within the chamber 92 increases against the combined effect of the coaxial springs 102 and 104, which springs may be replaced by other types of resilient members affording equivalent opposition to the pressure forces. As the piston moves against the springs and, if there is a restriction downstream, the pressure within the cylinder 96 increases and actuates a brake or similar type system. When the piston 98 has traveled through a predetermined stroke, it mechanically unseats valve 99 and allows fluid to bypass the cylinder. When the pressure in chamber 92 is decreased the piston will move to the left, as viewed in FIGURE 2, and this releases the valve 99, thus closing the bypass circuit. As the pressure within chamber 92 is decreased, the piston 98 continues to draw fluid from the brake pistons into the cylinder 96. This displacement of fluid from the brake by the adjuster establishes the proper brake clearance regardless of the amount of brake wear.

In the event of a downstream circuit failure resulting in overboard leakage, fluid upstream of the lockout cannot pass through the check valve 84 since this check valve cannot open until the threshold value of the pressure in chamber 92 is reached. In other words, until the check valve threshold pressure is reached, the circuit below the lockout is isolated. If the downstream leak is small enough so that flow through the orifice can maintain the required pressure, similar to the system of FIGURE 1, to keep the check valve open, the brake will remain operable.

While only two forms of the invention have been shown for purposes of illustration, it is to be clearly understood that various changes in the details of construction and arrangement of the parts may be made without departing from the spirit and true scope of the invention as defined in the appended claims.

We claim:

1. A combination fluid displacement adjuster reset mechanism and lockout device comprising:
   - a housing having a chamber therewithin;
   - a first pressure responsive member having an orifice therethrough operatively arranged in said chamber to divide said chamber into first and second variable volume chambers;
   - a second pressure responsive member having a passage therethrough which second pressure responsive member divides a third variable volume chamber from said second variable volume chamber;
   - a first valve operatively connected to said first pressure responsive member and adapted to open said orifice in response to a predetermined pressure in said second variable volume chamber to provide fluid communication between said first and second variable volume chambers and at all other times prevent said communication;
   - a second valve operatively connected to said second pressure responsive member to control said passage, which valve is arranged to open said passage in accordance with displacement of said second pressure responsive member in said third variable volume chamber as a result of pressure in said second variable volume chamber; and
   - means opposing motion of both said first and second pressure responsive members.

2. In a hydraulic brake system having a fluid pressure source and a means to be operated thereby a combination brake adjuster reset mechanism and fluid lockout device comprising:
   - a housing having a hollow interior with an inlet connected to said fluid pressure source and an outlet; connected to said means to be operated by said fluid pressure source;
   - a plurality of movable members mounted for limited travel within said housing and operatively connected to each other such that at least three variable volume chambers are formed namely an inlet variable volume chamber, an intermediate variable volume chamber and an outlet variable volume chamber, said movable members having passages therethrough;
   - valve means resiliently biasted to each of said movable members to close the passages through said movable members, which valve means are also held closed by pressure tending to move said movable members;
   - a mechanical valve control device within said third variable volume chambers to actuate the valve in one of the movable members, which control device is normally not contacting the valve until said one movable member has traveled a sufficient amount; and
   - a means to restrict flow through said combination brake adjusted reset mechanism and fluid lockout device in addition to said valve means whereupon only a limited flow may pass in the event said valve means are opened.

3. A combination brake adjuster reset mechanism and fluid lockout device according to claim 2 and wherein the valve in the other movable member is responsive to a pressure built up between said movable members to allow fluid flow to replenish the fluid supply between the movable members when said pressure is above a predetermined value.

References Cited by the Examiner

UNITED STATES PATENTS

| | | | |
|---|---|---|---|
| 697,140 | 4/02 | Goldschmidt | 188—196 |
| 1,569,143 | 1/26 | Robinson | 188—152.13 |
| 2,867,089 | 1/59 | Parmerlee | 60—54.5 |
| 2,923,132 | 2/60 | Oswalt | 60—54.5 |
| 3,053,349 | 9/62 | Huntress et al. | 188—196 X |

FOREIGN PATENTS

| | | |
|---|---|---|
| 1,116,482 | 2/56 | France. |

JULIUS E. WEST, *Primary Examiner.*

ROBERT R. BUNEVICH, *Examiner.*